United States Patent [19]

Stromberg

[11] Patent Number: 4,561,323
[45] Date of Patent: Dec. 31, 1985

[54] ADJUSTABLE STEERING COLUMN ASSEMBLY AND MECHANISM THEREFOR

[75] Inventor: Clinton V. Stromberg, Allen Park, Mich.

[73] Assignee: American Motors Corporation, Southfield, Mich.

[21] Appl. No.: 578,554

[22] Filed: Feb. 9, 1984

[51] Int. Cl.[4] .......................... B62D 1/18; G05G 5/06
[52] U.S. Cl. ........................................ 74/493; 74/533; 74/536; 74/537; 280/775
[58] Field of Search ................ 74/493, 495, 533, 536, 74/537; 280/775

[56] References Cited

U.S. PATENT DOCUMENTS

| | | | |
|---|---|---|---|
| 4,078,448 | 3/1978 | Naka | 74/536 |
| 4,463,626 | 8/1984 | Kazaoka | 74/536 |
| 4,495,833 | 1/1985 | Fourrey | 280/775 |

FOREIGN PATENT DOCUMENTS

| | | | |
|---|---|---|---|
| 3205416 | 10/1982 | Fed. Rep. of Germany | 74/493 |
| 48201 | 1/1982 | Japan | 74/493 |
| 48209 | 2/1982 | Japan | 74/493 |

*Primary Examiner*—William L. Freeh

*Attorney, Agent, or Firm*—Brooks & Kushman

[57] ABSTRACT

An adjustable tilt steering wheel column, including a tilt steering column mechanism which operates substantially independently from the steering column is disclosed. The tilt mechanism includes an upper plate, a lower plate, a hinge pin and a release lever. The upper and lower plates are connected by the hinge pin which allows for angular movement between the two plates. The upper plate has two vertical wall members spaced apart and positioned perpendicular to the hinge pin. The vertical wall members have a plurality of vertically spaced notches which are parallel to the hinge pin. An upper portion of the release lever includes a pair of spaced pin-carrying legs to coincide with the vertical wall members. The legs are pivotally connected to the lower plate by a pair of pivot bolts. A compression spring is mounted between the upper portion of the lever and a bracket mounted on the upper plate. The spring urges the pins into the notches of the vertical wall members. At least one and preferably two compression springs are mounted vertically on the upper plate to produce a tension force between the upper and lower plates.

10 Claims, 6 Drawing Figures

ADJUSTABLE STEERING COLUMN ASSEMBLY
AND MECHANISM THEREFOR

TECHNICAL FIELD

This invention relates to steering mechanisms for vehicles and, more particularly, to means for providing selective tilting of a steering wheel between a plurality of positions.

BACKGROUND ART

With current emphasis on fuel economy, the present trend in motor vehicle body styling is toward a low body silhouette. To maintain adequate interior headroom with the present low roof levels, it is necessary to provide a lower positioning of the vehicle seats. Attendant with the low seat placement, steering columns are now supported in a substantially horizontal position with the steering wheel overlying the driver seat. Low placement of the seat, coupled with the overlying position of the steering wheel, has produced a vehicle that is oftentimes difficult for the driver to enter and leave.

To facilitate ingress and egress of the driver to and from the vehicle, it has been proposed to support the driving wheel and column for swinging movement towards and away from the driver seat.

An adjustable steering wheel is also very desirable to accommodate vehicle operators of different physical size. Accordingly, vehicles are often provided with steering wheel assemblies which are selectively tiltable. In most instances this requires that the steering assembly include a means for holding the steering wheel at a selected position. Many such means have variously tended to be excessively complex, costly, prone to jamming and malfunction or have required undesirably complicated or physically awkward hand movements for the purpose of releasing and engaging a latching mechanism. In many cases, these prior mechanisms restrict access to adjacent portions of the vehicle. Another problem with such means is that installation on preexisting fixed steering wheel assemblies may require extensive modifications, if it is practical at all. Also many such prior mechanisms do not provide a positive locking action, but instead rely on a clamping or wedging action resulting from tightening of threaded elements or the like wherein the resistance of the steering assembly to unwanted tilting is dependent on the force applied to the clamping mechanism.

Such complex designs also tend to result in cumulative manufacturing tolerances creating a looseness in the assembly. Such devices also necessitate the use of a plurality of parts to guide the movement of the many movable members to secure them in selected positions. This proliferation of parts adversely affects the simplicity, cost and reliability of such devices.

U.S. Pat. No. 3,803,939 to Schenten discloses an adjustable tilting steering column, including a pair of brackets, one of which is connected to an instrument panel and the other one of which is connected to the column and which is slidable within the first bracket. A spring-biased clamping cam causes the outer bracket to clamp the inner bracket in any one of an infinite number of positions throughout the range of movement of the movable bracket.

U.S. Pat. No. 3,807,252 to Parr discloses a bracket which holds a steering wheel assembly at a selected position in a positive manner while providing for a convenient release for adjustment to another position. The bracket is secured to the housing for pivotal motion therewith and has a plurality of notches in one edge thereof. A spring-biased push rod has an angled inner end which engages a certain one of the notches on the bracket to hold the steering assembly in a selected position.

U.S. Pat. No. 3,718,053 to Cinadr discloses a tilt steering wheel mechanism including a positioning member and a sliding bolt which cooperate to permit the column to be pivoted to predetermined points about a horizontal axis for locking the wheel in an adjusted position.

U.S. Pat. No. 4,018,101 to Mihalic discloses a positioning device including a control lever operable to disable a pair of latching elements to allow movement and further operative to supply a transverse locking force to a pair of support plates when the movable member is in any selected position.

U.S. Pat. No. 4,335,625 to Nishikawa discloses a tiltable steering shaft mechanism comprising a stationary steering bracket and a swingable steering bracket mounted on the stationary steering bracket for swinging movement about a transversely extending first horizontal axis. A lower steering shaft is carried by the stationary steering bracket and an upper steering shaft is carried by the swingable steering bracket. An adjusting rod is carried by a support bracket which rod threadedly engages an adjusting bracket, which is linearly movable with respect to the support bracket.

Other U.S. patents to which this invention relates include United States patents to Young, Jr. U.S. Pat. No. 3,078,946; Glover et al U.S. Pat. No. 3,267,766; Reed U.S. Pat. No. 3,385,128; Scheffler, Jr. U.S. Pat. No. 3,555,924; Baker U.S. Pat. No. 3,799,569; Krom U.S. Pat. No. 3,851,543 and Broucksou U.S. Pat. No. 4,195,535.

DISCLOSURE OF THE INVENTION

An object of the present invention is to provide a steering column assembly and adjustable mechanism therefor, wherein the mechanism is relatively simple and low cost.

Another object of the present invention is to provide an adjustable mechanism for a steering column assembly wherein the adjustable mechanism is adapted for installation on preexisting fixed steering wheel assemblies and comprises a self-contained, independent unit.

Yet still another object of the present invention is to provide an adjustable mechanism for a steering column assembly wherein the adjustable mechanism is adapted to tilt a steering column assembly not only vertically but also horizontally.

Yet still another object of the present invention is to provide an adjustable mechanism for a steering column assembly including upper and lower plates which are hingedly connected together by a hinge pin to allow angular movement between the plates and a release lever which is pivotally connected to the lower plate; and wherein a locking portion of the lever is spring-biased to lock the upper and lower plates in a selected angular position.

In carrying out the above objects and other objects of the present invention, an adjustable mechanism for a steering column assembly of a vehicle comprises first and second plates one of said plates being adapted to be mounted to the vehicle, the first plate including at least one wall member attached thereto and extending therefrom. The wall member has a plurality of spaced notches formed therein. The other of the plates is adapted to be attached to the steering column and movable therewith adjacent and relative to the one plate. A hinge means hingidly connects the first and second plates to permit angular movement between the plates about a hinge axis. A locking mechanism including a lever is pivotally connected to the second plate. The lever includes a locking portion which extends between the first and second plates. The locking mechanism also includes a spring means for urging a part of the locking portion into one of the notches to lock the first and second plates in one of the like plurality of angular positions. The lever also includes an actuating portion which extends away from the first plate for pivoting the lever against the biasing axis of the spring means to unlock the first and second plates thereby permitting adjustment of the angular position.

Further to carrying out the above objects and other objects of the present invention an adjustable steering column assembly for a vehicle includes a steering column having a steering wheel at the upper end thereof. A mounting means is mounted to the vehicle wherein the steering column is movable relative to the mounting means. First and second plates are provided. One of the plates is mounted to the mounting means. The first plate includes at least one wall member attached thereto and extending therefrom. The wall member has a plurality of spaced notches formed therein. The other of the plates is attached to the steering column and is movable therewith adjacent and relative to the one plate. Hinge means hingedly connect the first and second plates to permit angular movement between the plates about a hinge axis. A locking mechanism, including a lever, is pivotally connected to the second plate. The lever includes a locking portion extending between the first and second plates. The locking mechanism includes a spring means for urging a part of the locking portion into one of the notches to lock the first and second plates in one of the like plurality of angular positions. The lever includes an actuating portion which extends away from the first plate for pivoting the lever against the biasing action of the spring means to unlock the first and second plates to permit adjustment of the angular position.

Preferably, the upper plate has two vertical wall members spaced apart and positioned perpendicular to the hinge means. The wall members extend vertically from the first plate and the wall members have a plurality of vertically spaced notches formed therein.

Also preferably, the locking portion of the lever includes a pair of spaced pin-carrying legs to coincide with the vertical wall members. The lever is fastened to the second plate by a pair of pivot bolts. A compression spring urges the locking portion of the lever towards the vertical wall members to thereby urge the pins into the notches of the vertical wall members. At least one compression spring is mounted vertically on the first plate to produce a tension force between the first and second plates.

The adjustable mechanism of the present invention comprises a self-contained independent unit which is relatively uncomplicated in design and has a relatively low cost. The adjustable mechanism is readily adaptable for factory production for numerous motor vehicles and also may be utilized as an after-market, dealer-installed option for motor vehicles.

The pair of spaced vertical wall members provides added stability to the adjustable mechanism when the adjustable mechanism is utilized on steering column assemblies having an anti-theft lock.

The above objects and other objects of the present invention are readily apparent from the following detailed description of the best mode for carrying out the invention when taken in connection with the accompanying drawings.

BEST MODE FOR CARRYING OUT THE INVENTION

Figure 1:
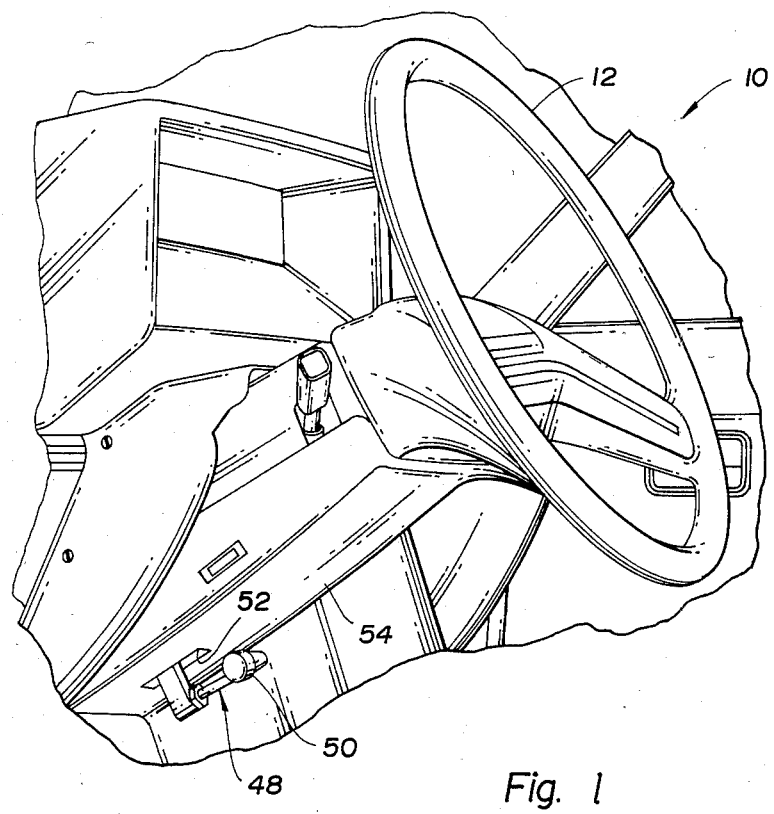
FIG. 1 is a perspective view, partially broken away, of the drive compartment of a motor vehicle, including a steering wheel and a manual selector arm extending through a slot in the housing of a steering column.
Figure 2:
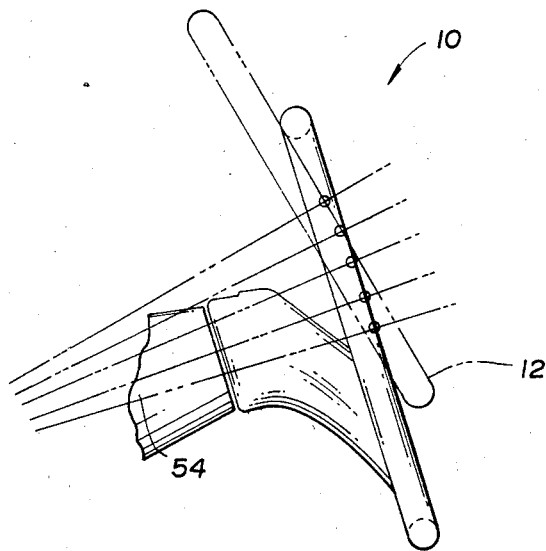
FIG. 2 is a side elevational view, partially broken away, showing the various adjustment positions of the steering wheel in phantom.

Referring now to FIG. 1, there is illustrated generally at 10, an adjustable steering column assembly constructed in accordance with the present invention, disposed within the passenger compartment of a vehicle body. The adjustable steering column assembly 10 is of the tilt type to enable the vehicle operator to select the most convenient position of a steering wheel 12 to assure maximum comfort and freedom from fatigue. In order to obtain optimum benefits from the adjustment available in an assembly of this type, it is apparent that a large number of increments of adjustment within the available range are necessary. As seen in FIG. 2, phantom lines indicate five adjustment positions. Because even a slight lack of rigidly in the steering column assembly 10 is not only readily discernible but highly disconcerting to the operator, it is essential that each increment of adjustment be accomplished in a manner exhibiting maximum rigidity and freedom from accidental displacement.

Figures 3, 4:
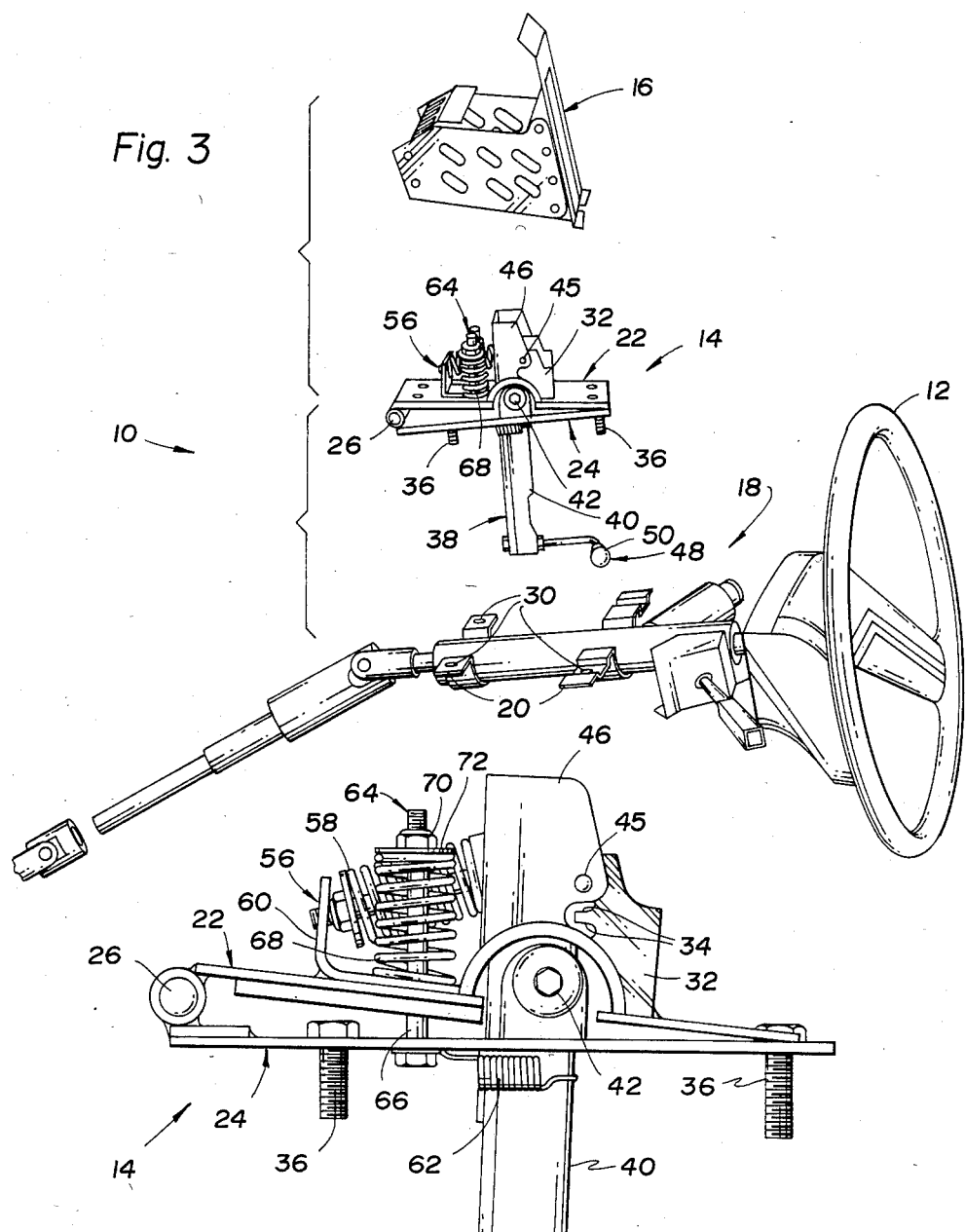
FIG. 3 is an exploded view illustrating the relative positions of the various components of an adjustable steering column assembly constructed in accordance with the present invention.
FIG. 4 is a side elevational view of an adjustable mechanism for the steering column assembly in one of its adjustment positions.
Figure 5:
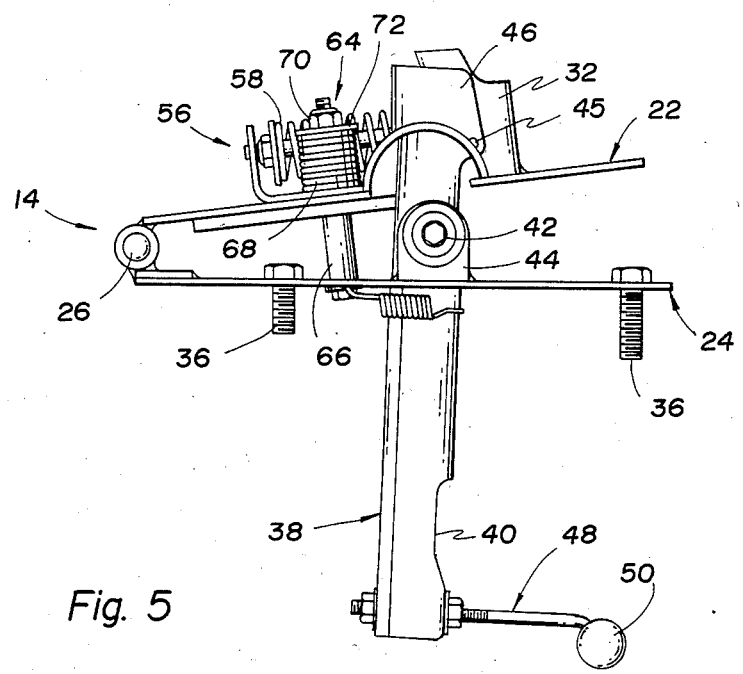
FIG. 5 is a view similar to FIG. 4 with the adjustable mechanism in a second adjustment position.

Referring now to FIG. 3 there is seen an adjustable tilt mechanism, generally indicated at 14, which comprises a self-contained independent unit which can be mounted on an existing body structure 16, such as by mounting bolts (not shown), and also to a steering column, generally indicated at 18, at mounting brackets 20 thereof. The tilt mechanism 14 may be installed to the body structure 16 and the steering column 18 either during factory production or as an after-market, dealer-installed option for previously built vehicles.

Figure 6:
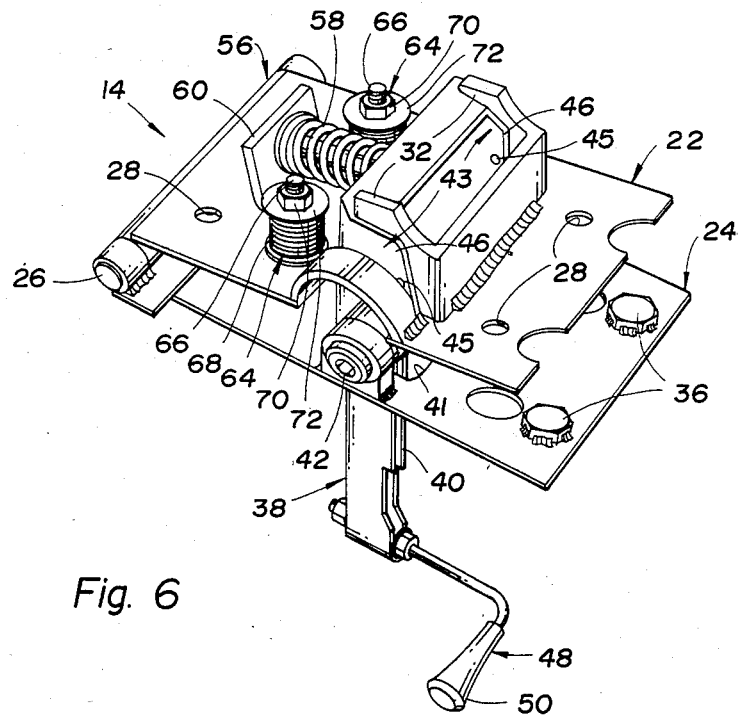
FIG. 6 is a perspective view of the adjustable mechanism in the adjustment position of FIG. 5.

Referring now to the remainder of the figures, the adjustable tilt mechanism 14 comprises first (i.e. upper) and second (i.e. lower) plates generally indicated at 22 and 24, respectively, which are hingedly connected together by a hinge pin 26 to permit angular movement between the first and second plates 22 and 24, respectively. As best seen in FIG. 6, the first plate 22 has a plurality of spaced apertures 28 formed therein for receiving mounting bolts (not shown) to mount the upper plate 22 to the body structure 16. The apertures 28 coincide in location with apertures 30 formed in the brackets 20 which would normally receive the mounting bolts from the body structure 16 in the absence of the adjustable tilt mechanism 14.

On the top surface of the plate 22 is mounted a pair of vertical wall members 32 which comprise a single U-shaped bracket which, in turn, is welded at the top surface of the first plate 22. The wall members 32 are perpendicular to the axis of the hinge pin 26. Each of the wall members 32 preferably has five vertically spaced notches 34 formed therein and opening outwardly towards the hinge axis 26. The notches 34 are vertically spaced and are adapted to receive and retain therein a part of a locking mechanism, which will be described in greater detail hereinbelow.

The lower plate 24 is mounted to the steering column 18 by mounting bolts 36, which extend through spaced apart holes formed through the bottom plate 24 and into the apertures 30.

A locking mechanism, generally indicated at 38 is provided for selectively locking the first and second plates 22 and 24 together in a desired angular position, thereby locking the steering column assembly 10 in one of the tilt positions shown in FIG. 2. The locking mechanism 38 includes a release lever 40, which is pivotally connected to the lower plate 24 by a pair of spaced pivot bolts 42 (only one of which is shown in the figures). The pivot bolts 42 pivotally connect a pair of integrally formed spaced legs 43 of an upper locking portion of the release lever 40 to the second plate 24 by mounting flanges 44 (only one of which is shown). The flanges 44 are fixedly mounted at the top surface of the lower plate 24, such as by welding. Each leg 43 extends through a slot 41 formed through the lower plate 24. Each leg 43 includes a crosspin 45 mounted between a pair of spaced sidewalls 46 of each leg 43.

Attached at the lower end of the lever 38 is a selector arm 48 having a manually actuated handle portion 50. The selector arm extends outwardly through a slot 52 formed through an outer housing part 54 of the steering column 18. Movement of the selector arm 48 towards the driver of the vehicle disengages the crosspins 45 from the notches 34 to permit relative angular movement between the top and bottom plates 22 and 24, respectively.

A first spring mechanism, generally indicated at 56, biases the upper locking portion of the lever 38 so as to urge the crosspins 45 into their respective aligned notches 34. The spring mechanism 56 includes a compression spring 58 which is mounted perpendicular to the axis of the hinge pin 26. The compression spring 58 is mounted between the upper locking portion of the lever 38 and a bracket 60 mounted on the upper plate 22. The spring mechanism 56 also includes a spring 62 connected at its opposite ends to the lower portion of the lever 38 and the lower plate 24 to facilitate pivotal movement of the lever 38 about the pivot bolts 42.

A second spring mechanism preferably comprising a pair of spaced compression spring assemblies 64 are provided for causing a tension force between the upper and lower plates 22 and 24, respectively. Each spring assembly 64 includes a central rod 66 which is mounted on the lower plate 24 and which extends upwardly through the upper plate 22 and a compression spring 68 which is mounted vertically on the upper plate 22. A nut and a washer 70 and 72, respectively, mounted on the threaded end of the rod 66, hold its respective compression spring 68 in tension to urge the upper and lower plates 22 and 24, respectively, together.

Adjustment of the steering wheel 12 to a desired vertical position by tilting the steering column 18 is accomplished in a relatively simple fashion. Initially, the driver of the vehicle pulls the selector arm 48, thereby causing the release lever 38 to pivot about the pivot bolts 42. This action disengages the crosspins 45 mounted on the spaced legs 43 of the lever 38 from the vertical notches 34 formed in the wall members 32. The steering column 18 is then free to tilt to any one of a plurality of positions, five of which are shown in FIG. 2. After moving the steering wheel 12 to a desired position, the selector arm 48 is released, thereby allowing the first spring mechanism 56 to cause the lever 38 to rotate in the opposite direction and urge the crosspins 45 into another set of vertical notches 34 in the wall members 32.

As can be readily appreciated, only one wall member 32 need be provided, as well as one crosspin 45. However, the pair of wall members 32 increases the stability of the mechanism 14 to resist torque when an anti-theft lock mechanism (not shown) of the steering column 18 is engaged.

Also as can be readily appreciated, a single spring assembly 64 may be provided to further minimize the cost and complexity of the tilt mechanism 14.

The tilt mechanism 14 can be readily adapted to tilt the steering column 18 horizontally if desired since the tilt mechanism 14 is a self-contained, independent unit. Also, the tilt mechanism 14 may be installed not only during factory production of the vehicle but may be utilized as an after-market, dealer-installed option for vehicles already built.

While the best mode for carrying out the invention has herein been described in detail, those skilled in the art to which this invention relates will recognize various alternative designs and embodiments for practicing the present invention as defined by the following claims.

What is claimed is:

1. An adjustable mechanism for a steering column assembly of a vehicle, the mechanism comprising:

first and second plates, one of said plates being adapted to be mounted to said vehicle, said first plate including at least one wall member attached thereto and extending therefrom, said wall member having a plurality of spaced notches formed therein; the other of said plates being adapted to be attached to said steering column and movable therewith adjacent and relative to said one plate;

first spring means including at least one compression spring for urging the first and second plates together;

hinge means for hingedly connecting said first and second plates to permit angular movement between the plates about a hinge axis; and a locking mechanism including a lever pivotally connected to said second plate, the lever including a locking portion extending between the first and second plates, said locking mechanism including second spring means for urging a part of said locking portion into one of said notches to lock the first and second plates in one of said like plurality of angular positions and wherein said lever includes an actuating portion extending away from said first plate for pivoting the lever against the biasing action of the second spring means to unlock the first and second plates to permit the adjustment of said angular position.

2. An adjustable steering column assembly for a vehicle comprising:

a steering column having a steering wheel at the upper end thereof;

mounting means mounted to the vehicle, said steering column being movable relative to said mounting means;

first and second plates, one of said plates being mounted to said mounting means, said first plate including at least one wall member attached thereto and extending therefrom, said wall member having a plurality of spaced notches formed therein; the other of said plates being attached to said steering column and movable therewith adjacent and relative to said one plate;

first spring means including at least one compression spring for urging the first and second plates together;

hinge means for hingedly connecting said first and second plates to permit angular movement between the plates about a hinge axis; and a locking mechanism including a lever pivotally connected to said second plate, the lever including a locking portion extending between the first and second plates, said locking mechanism including second spring means for urging a part of said locking portion into one of said notches to lock the first and second plates in one of said like plurality of angular positions and wherein said lever includes an actuating portion extending away from said first plate for pivoting the lever against the biasing action of the second spring means to unlock the first and second plates to permit the adjustment of said angular position.

3. The assembly as claimed in claim 1 or claim 2 wherein said notches are generally parallel to the hinge axis.

4. The assembly as claimed in claim 1 or claim 2 wherein said second spring means includes a compression spring connected at its opposite ends to the first plate and the locking portion of the lever to pivot the locking portion of the lever with respect to the second plate.

5. The assembly as claimed in claim 4 wherein said second spring means includes a biasing spring connected at its opposite ends to the actuating portion of the lever and the second plate to urge the lever to pivot with respect to the second plate.

6. The assembly as claimed in claim 1 or claim 2 including a selector arm mounted on the actuating portion of said lever for movement therewith to facilitate pivoting of said lever.

7. The assembly as claimed in claim 1 or claim 2 wherein said first spring means includes at least one central rod mounted to said second plate and extending through a hole formed in said first plate and through said compression spring and wherein the top of said compression spring is anchored at the top of said central rod.

8. The assembly as claimed in claim 1 or claim 2 including two wall members spaced in a direction generally parallel to the hinge axis.

9. The assembly as claimed in claim 8 wherein said locking portion includes a pair of spaced interconnected arm members aligned with said wall members.

10. The assembly as claimed in claim 9 wherein each of said arm members includes a crosspin mounted thereon and generally parallel to the hinge axis, each of said crosspins being received and retained within a selected one of the notches in its corresponding wall member.

* * * * *